Figure 1A:
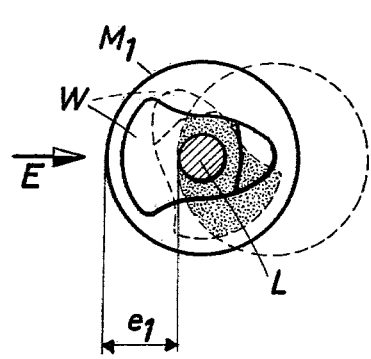

United States Patent [19]

Kralowetz et al.

[11] 4,326,323
[45] Apr. 27, 1982

[54] CRANKSHAFT MILLING MACHINE

[75] Inventors: Bruno Kralowetz; Gottfried Blaimschein, both of Steyr, Austria

[73] Assignee: GFM Gesellschaft fur Fertigungstechnik und Maschinenbau Gesellschaft m.b.H., Steyr, Austria

[21] Appl. No.: 127,949

[22] Filed: Mar. 7, 1980

[30] Foreign Application Priority Data

Mar. 8, 1979 [AT] Austria .................................. 1728/79

[51] Int. Cl.³ ............................................... B23C 3/06
[52] U.S. Cl. ........................................ 29/6; 51/105 SP; 409/199; 409/200
[58] Field of Search ............... 409/131, 132, 200, 197, 409/199, 198, 79, 80; 51/105 SP, 73 GG; 29/6

[56] References Cited

U.S. PATENT DOCUMENTS

| | | | |
|---|---|---|---|
| 4,099,431 | 7/1978 | Kreucher | 409/198 X |
| 4,116,111 | 9/1978 | Schmid | 51/105 SP X |
| 4,180,359 | 12/1979 | Schmid | 409/199 X |
| 4,208,156 | 6/1980 | Kralowetz | 409/200 X |

FOREIGN PATENT DOCUMENTS

| | | | |
|---|---|---|---|
| 700785 | 12/1940 | Fed. Rep. of Germany | 51/105 SP |
| 2658970 | 11/1978 | Fed. Rep. of Germany | 409/199 |
| 47-273127 | 2/1972 | Japan | 51/105 SP |
| 54-137782 | 10/1979 | Japan | 409/199 |

*Primary Examiner*—William R. Briggs
*Attorney, Agent, or Firm*—Kurt Kelman

[57] ABSTRACT

Each of two tools is used in a sequence of operations to machine respective cylindrical portions of a multiple-crank crankshaft and the crankweb side faces adjoining said cylindrical portion. To permit an optimum utilization of the two tools and to ensure a substantial shortening of the time required for the machining of a crankshaft, the infeeding direction and the orbital feed rate of each tool are controlled independently of the other tool and only in dependence on the requirements for the respective operation. The crankshaft is held in a fixed position until its machining has been completed. In a milling machine for carrying out the process, each tool consists of an internal milling cutter and means are provided for moving said cutters independently of each other along three coordinate axes.

3 Claims, 5 Drawing Figures

CRANKSHAFT MILLING MACHINE

This invention relates to a process of machining multiple-crank crankshafts with two tools, each of which performs in each machining step an infeeding movement and an orbital feed movement to machine a cylindrical shaft portion and crankweb side faces adjoining said cylindrical portion, and to a milling machine for carrying out said process.

To permit the work to be carried out as quickly as possible, two tools arranged one beside the other are often used to machine a crankshaft. In the known processes these tools are operated in a certain interdependence because they are always infed into the workpiece in the same direction and because their infeeding and orbital feed movements must be coordinated. This practice requires that the two tools are operated at the same time so that working time is lost because neither tool can be used optimally but the operation of both tools depends on the requirements for the operation of the tool which is operating under less favorable conditions. When the crankshaft is being rotated for the machining of a cylindrical portion and is held in position only for the infeeding movement, then the crankshaft will have to be held in position until both tools have completed the infeeding movement before the cylindrical portion can be machined. As the infeeding movement before the machining of a mainshaft portion is performed within a shorter time than before the machining of a crankpin, the tool used to machine the mainshaft portion will be idle for a certain time. Additional idle times will be due to the fact that both tools perform the infeeding movement in the same direction because this has the result that they cannot simultaneously remove a maximum quantity of material from the crankweb side faces at the same time and very long chips will be obtained during the subsequent machining of the cylindrical portions. Owing to these long chips, the orbital feed rates must be small so that longer milling times will be required. Because the infeeding movement is always effected in the same predetermined direction, the crankshaft must be angularly indexed and this requires additional time. In the machining of crankshafts in which the angular spacing of cranks differs from 0° and 180°, these disadvantages are particularly unfavorable so that the known machining processes using two tools cannot be economically used for that purpose at all.

It is an object of the invention to eliminate these disadvantages and to provide a process which is of the kind described first hereinbefore and which permits an optimum utilization of the two tools and ensures in a simple manner a substantial further shortening of the time required for the machining of crankshafts. Besides, it is desired to provide a milling machine which is particularly suitable for carrying out that process.

This object is accomplished in that the infeeding direction and the orbital feed rate of each tool are controlled independently of the other tool and only in dependence on the requirements for the respective operation. As a result, the two tools are operated entirely independently of each other, different from the previous methods, so that each tool can be operated optimally in dependence on the respective requirements and can perform each operation continuously and there will be no need for one tool to remain idle during the infeeding movement of the other tool and the orbital feed rate need not be decreased owing to the fact that material is removed at an inadequate rate during infeeding. Because the operation of each tool can be optimized independently of the other tool, the present process can be used to advantage also with crankshafts in which the angular spacing of cranks differs from 0° and from 180°. As a result of the optimized operation of each tool, the required machining time may be decreased by about 30 to 40%, depending on the design of the crankshaft. This can be proved by a practical example. When the crankshaft was rotated during the machining operation, the infeeding of the tool for machining the mainshaft portions took 0.37 minute and the infeeding of the tool for machining the crankpins took 0.64 minute. The orbital feed rate must be so selected that the longest chip removed from the mainshaft portion or from the crankpin does not exceed a certain thickness. This requires an orbital period of 1.34 minutes. It is apparent that the total machining time for both operations amounts to 1.98 minutes because it equals the sum of the longest infeeding time plus the orbital period. When the same shaft is machined by the process according to the invention, the tool for machining the mainshaft portions will have an infeeding time of 0.64 minute and an orbital period of 1.04 minutes and the tool for machining the crankshafts will have an infeeding time of 0.64 minute and an orbital period of 0.72 minute. The operations of machining the mainshaft portion and the crankpin will then take 1.41 minutes, i.e., the time required for the operation taking a longer time. It is seen that substantial time is saved in the machining of one crankpin and one mainshaft portion. These savings of time will accumulate during the machining of the entire crankshaft, which comprises a plurality of crankpins and mainshaft portions. This saving of time will even be effected when the two tools begin their operation at the same time and the tool used for the shorter operation waits for the other tool so that both tools can be jointly moved to new positions in the longitudinal direction of the workpiece. Alternatively, each tool may also be moved to a new operating position independently of the other as soon as the tool concerned has performed a machining operation. This will result in an additional saving of time. If the tools are used entirely independently of each other in this way, the crankshaft may be supported, e.g., in the middle of its length, by a backrest and each tool may be used to machine in succession the crankpins and mainshaft portions as well as the adjoining crankweb side faces of one half of the crankshaft.

As much material as possible should be removed from the crankweb side faces during the infeeding operation so that a favorable orbital feed rate can be adopted for the subsequent machining of the crankpin. For this reason the infeeding direction of the tool used to machine a crankpin is virtually predetermined by the two parallel crankwebs which adjoin that crankpin and extends along the straight line from the axis of the mainshaft portion to the axis of the crankpin. There are different conditions regarding the machining of the mainshaft portions because the crankwebs which adjoin a given mainshaft portion are often angularly spaced. In order to achieve optimum results in that case, too, it is within the scope of the invention to infeed the tool in the direction of the angle bisector of two cranks which adjoin a mainshaft portion when said mainshaft portion and the adjoining crankweb side faces are to be machined. This practice will ensure that a maximum area of the crankweb side faces which adjoin the mainshaft portion will be machined as the tool is infed.

The invention provides also a milling machine which serves to carry out the process and comprises a machine bed, two workpiece supports and two milling cutters consisting of internal milling cutters, wherein a separate milling head is provided for each cutter and is mounted on a carriage, each milling head constitutes a compound slide, the drive means for the compound slides are adapted to be controlled independently of each other, the infeeding direction of each cutter can be freely selected and a backrest is preferably provided for supporting the workpiece between the cutters. In such a milling machine, the two cutters can be operated independently of each other and as desired so that the machine can be used to carry out the process according to the invention without a special structural expenditure. It will be particularly desirable to provide a numerical control system for controlling the movement of the center of each cutter by a control of the drive means for the respective compound slide and preferably also for the respective carriage. Such numerical control permits the two cutters to be moved independently from each other in three coordinate directions, as is required, with simple means.

Figure 1B:
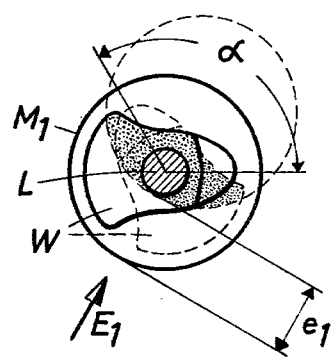

The subject matter of the invention is shown strictly diagrammatically and by way of example on the accompanying drawings, in which FIGS. 1a and 1b illustrate the infeeding of a tool used to machine a mainshaft portion in the known process and in the process according to the invention, respectively.

Figure 2A:
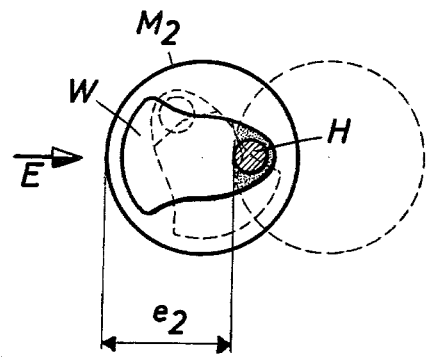
Figure 2B:
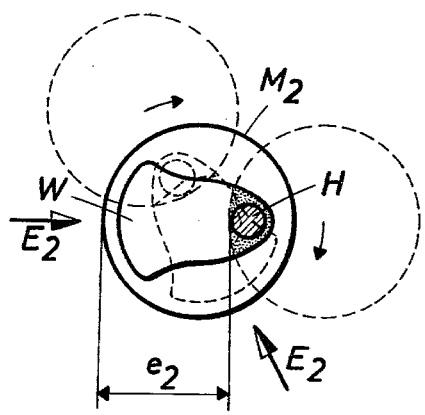
Figure 3:
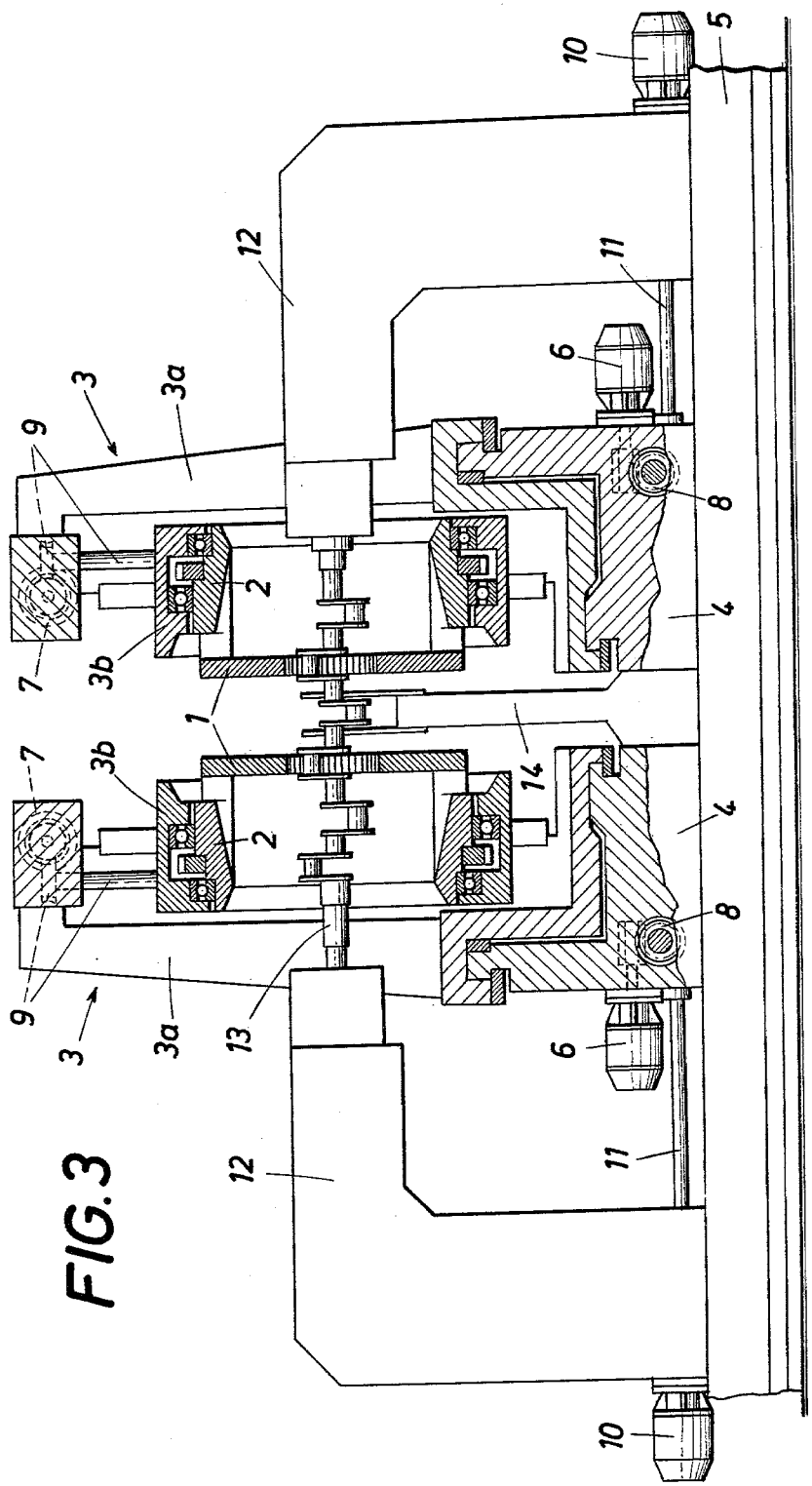

FIGS. 2a and 2b illustrate the infeeding of a tool used to machine a crankpin in the known process and in the process according to the invention, respectively, and FIG. 3 is a side elevation showing a milling machine according to the invention, partly in section.

In the known process of machining crankshafts with two internal milling cutters, both cutters $M_1$, $M_2$ must be infed in the same direction and their infeeding operations and orbital feed rates must be coordinated. If, is indicated in FIGS. 1a and 2a, the cutter $M_1$ is used to machine a mainshaft portion L, the cutter $M_2$ is used to machine a crankpin H, and if the crankweb side faces W adjoining a given cylindrical portion of the crankshaft are to be machined in the same operation as the cylindrical portion, then the two cutters $M_1$, $M_2$ will be infed in the direction indicated by the arrow E. As the infeeding of cutter $M_1$ over the distance $e_1$ and the infeeding of the cutter $M_2$ over the distance $e_2$ take different times, the cutter $M_1$ which has been infed over the distance $e_1$ must wait until the cutter $M_2$ has completed its infeeding over the distance $e_2$. Thereafter, the mainshaft portion L and the crankpin H are machined at the same time. The orbital feed rate for this operation cannot be optimally selected for both cutters $M_1$, $M_2$ because, during the machining of the cylindrical shaft portions, the two cutters must machine the crankweb side faces in different areas (stippled on the drawing) and the orbital feed rate must be selected with a view to the longest chips which are still to be removed. Particularly unfavorable conditions will be obtained if the angular spacing of the cranks of the crankshaft to be machined differs from 0° and 180°, as shown on the drawing. In such a crankshaft, a relatively large area (stippled in FIG. 1a) of the crankweb side faces W has not yet been machined when the infeeding of the cutter $M_1$ for machining the mainshaft portion has been completed. Besides, the crankshaft must be indexed in angular steps corresponding to the angular spacing of the crankpins.

Much more favorable conditions will be obtained when the cutters $M_1$ and $M_2$ are operated in accordance with the process of the invention, as is apparent from FIGS. 1b and 2b. In that case, the cutters $M_1$, $M_2$ can be operated independently of each other so that the optimum infeeding direction and orbital feed rate can be selected for each cutter in dependence on the cylindrical shaft portion to be machined at the same time as the adjoining crankweb side faces. The cutter $M_1$ for machining the mainshaft portion L (FIG. 1b) is infed in the direction indicated by the arrow $E_1$. That direction has been so selected that the crankweb side faces W are machined during the infeeding in an area which is as large as possible. For this reason, the infeeding direction corresponds to the bisector of the angle $\alpha$ defined by by the two crankwebs which are to be machined during the infeeding. As a result, that area of the crankweb side faces W which has not yet been machined when the infeeding over the distance $e_1$ has been completed is minimized. This is also apparent from a comparison of the corresponding stippled areas in FIGS. 1a and 1b. Because only a smaller area of the crankweb side faces must be machined during the machining of the cylindrical shaft portion, a higher orbital feed rate can be used during the machining of said cylindrical portion. This machining can begin as soon as the infeeding of the cutter $M_1$ over the distance $e_1$ has been completed because it is no longer necessary to wait until the infeeding of the cutter $M_2$ has been completed too. The conditions of the operation of the cutter $M_2$ are also selected only in dependence on the requirements of the machining of the respective crankpin. It will be understood that the crankshaft need not be angularly indexed because the infeeding direction $E_2$ of the cutter $M_2$ can be freely selected in dependence on the actual orientation of the crank concerned. As soon as the cutter $M_2$ has been infed over the distance $e_2$, it begins to machine the crankpin H. A relatively high orbital feed rate may be adopted for this machining because a major part of the crankweb side faces W which adjoin the crankpin H have been machined during the infeeding and only a rather small area of these side faces must be machined at the same time as the crankpin.

FIG. 3 shows a milling machine comprising two tools which can be operated independently of each other. The tools consist of internally cutting, annular inserted-tooth cutters 1, each of which is mounted in a tool drum 2 which is carried by a separate compound slide 3. Each compound slide 3 comprises a horizontal or base slide 3a and a vertical or cross slide 3b. Each compound slide 3 is mounted on a carriage 4. The carriages 4 are movable along the machine bed 5. Separate motors 6, 7 are provided for driving the horizontal and vertical slides 3a, 3b of each compound slide 3 and are coupled to the respective slides 3a, 3b by suitable transmissions and screws 8. 9. A separate motor 10 is also provided for driving each carriage 4 coupled to it by a screw 11.

The means for driving the carriages and slides and the movements controlled by them are controlled by a numerical control system so that the two cutters 1 are movable independently of each other along three coordinate axes. Two workpiece supports 12 are mounted on the machine bed 5 of the milling machine and hold the workpiece 13 in a fixed position until all cylindrical portions and crankweb side faces of the crankshaft have been machined. There is also a backrest 14 which serves to support the workpiece 13 as it is machined by the cutters 1. The backrest 14 is longitudinally slidably mounted on the machine bed 5 between the two carriages 4 and can support one mainshaft portion of the workpiece or two of said mainshaft portions, as is indicated in FIG. 3.

Because the two compound slides 3 are numerically controlled independently of each other, each of the two cutters 1 of the milling machine can be operated entirely independently of each other in optimum adaptation to that portion of the workpiece which is to be machined by the cutter at a time. As the infeeding direction and the orbital feed rate of each cutter can be selected independent of the other, the machining can be effected with that milling machine in extremely short times.

What is claimed is:

1. A machine for milling crankshafts having a plurality of cranks, comprising
   a machine bed,
   two workpiece supports mounted on said bed and spaced apart in a first direction and adapted to support a crankshaft workpiece and to hold it in a fixed position against rotation,
   carriage means mounted on said bed and movable relative thereto in said first direction,
   first and second compound slides spaced apart in said first direction and each of which comprises a base slide mounted on said carriage means and movable relative thereto in a second direction at right angles to said first direction, and a cross slide mounted on said base slide and movable relative thereto in a third direction at right angles to said first and second direction,
   first and second reversible base slide drive means operatively connected to said base slides of said first and second compound slides, respectively, and operable to move said base slide in said second direction,
   means for controlling said base slide drive means independently of each other in sense and speed,
   first and second reversible cross slide drive means operatively connected to said cross slides of said first and second compound slides, respectively, and operable simultaneously with said first and second base slide drive means, respectively, to move said cross slides of said first and second compound slides, respectively, in said third direction, and
   means for controlling said cross slide drive means independently of each other in sense and speed.

2. A milling machine as set forth in claim 1, in which said carriage means comprise two carriages, each of which carries one of said compound slides.

3. A milling machine as set forth in claim 1, in which a backrest for supporting said crankshaft workpiece is mounted on said machine bed between said compound slides.

* * * * *